US006701847B2

(12) United States Patent
Weichmann

(10) Patent No.: US 6,701,847 B2
(45) Date of Patent: Mar. 9, 2004

(54) METHOD OF VARYING THE INK DENSITY OF THE FULL TONE IN OFFSET PRINTING WITHIN A ROTARY PRINTING MACHINE

(75) Inventor: Armin Weichmann, Kissing (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 10/122,540

(22) Filed: Apr. 15, 2002

(65) Prior Publication Data

US 2002/0152911 A1 Oct. 24, 2002

(30) Foreign Application Priority Data

Apr. 20, 2001 (DE) ........................................ 101 19 368

(51) Int. Cl.[7] .......................... B41F 1/16; B41B 17/34; H04N 1/405

(52) U.S. Cl. ....................... 101/492; 358/1.9; 358/3.06

(58) Field of Search ................................ 101/492, 453, 101/483, 137, 468, 395, 401.1; 358/1.9, 3.01, 3.06, 3.07, 3.08, 3.19, 3.29, 3.3, 3.31; 399/98, 99, 180

(56) References Cited

U.S. PATENT DOCUMENTS 5,121,689 A * 6/1992 Fadner ....................... 101/365
5,797,632 A * 8/1998 Rice ........................... 283/114
6,060,208 A 5/2000 Wang ......................... 430/201
6,198,886 B1 * 3/2001 Brewington ................. 399/49
6,213,018 B1 * 4/2001 Samworth ................... 101/395
6,230,622 B1 * 5/2001 Dilling ....................... 101/484
6,522,421 B2 * 2/2003 Chapman et al. .......... 358/1.15
2002/0083855 A1 * 7/2002 Samworth .............. 101/352.13

FOREIGN PATENT DOCUMENTS

DE 695 05 985 7/1995 ............. G03F/7/24
DE 199 53 145 10/2000 ............. G03F/3/10
FR 2 660 245 4/1990 ............ B41N/1/00

* cited by examiner

*Primary Examiner*—Andrew H. Hirshfeld
*Assistant Examiner*—Hoai-An D. Nguyen
(74) *Attorney, Agent, or Firm*—Cohen, Pontani, Pontani & Lieberman

(57) ABSTRACT

A method of varying the ink density of the full tone in printing within a rotary printing machine with an ink application system which can provide a constant quantity of ink which, in spite of constant ink supply from the inking unit, permits control of the full-tone density or adaptation of the raster tonal values in the print. The method includes setting the binary image on a printing plate. A basic raster of raster points, which determines the area coverage of the binary image, is produced on the printing plate for the variable-area image information. The basic raster is then superimposed on a fine microraster in such way that the area coverage of the basic raster is reduced by a percentage which can be set between 0% and 100%.

15 Claims, 3 Drawing Sheets

Printing plate

Printing material

A)

B)

A)

B)

C)

METHOD OF VARYING THE INK DENSITY OF THE FULL TONE IN OFFSET PRINTING WITHIN A ROTARY PRINTING MACHINE

BACKGROUND OF THE INVENTION

1. Field of the Invention

The present invention relates to a method of varying the ink density of the full tone in offset printing within a rotary printing machine.

2. Description of the Related Art

In digital printing processes, i.e., processes for producing printing plates in a binary sense, an ink supply is either accepted locally or not. This is the case, for example, in planographic printing or offset printing. The ink density of uninterrupted ink layers is the full tone characteristic of the ink layer and is controlled by the rate of the ink supply from the ink supply system to the printing plate.

In conventional offset printing, the ink supply and therefore the thickness of the ink layer supplied to the printing plate is regulated via inking zone screws. The printing plate has ink-accepting and ink rejecting regions and picks up the ink in proportion to the amount supplied only in those regions that are ink-accepting. The amount of ink picked up is also dependent on the ink splitting which occurs. A higher supply of ink from the ink supply system produces a higher ink layer density and therefore a higher full-tone density.

However, the ability of the inking unit to regulate the ink supply has disadvantages both with regard to the expenditure on control and also with regard to the complexity of the inking unit which results from this. The regulation of the ink supply also has a disadvantage with regard to the desired freedom of reaction of various ink uptake rates on following printed copies.

To reduce these disadvantages, short-form inking units such as the Anilox inking unit in offset printing have been developed for printing with low-viscosity printing inks for newspaper printing, for example, which bring the ink more directly onto the printing plate via an engrave roll and few intermediate cylinders. These short-form inking units therefore have a considerably reduced complexity with all the advantages which result from this. However, this form of the inking unit permits only very restricted regulation of the ink supply.

Each printing material needs a specific quantity of ink for a defined full-tone density, depending on the surface roughness, absorbency, ink absorption and so on. An inking unit on which the quantity of ink cannot be regulated in connection with a binary printing plate can therefore implement only specific full-tone densities, which fluctuate in accordance with the type of printing material, but the intention is not for a different engrave roll or an ink with a different pigment concentration or viscosity to be used depending on the printing material.

SUMMARY OF THE INVENTION

It is an object of the present invention to develop a method of varying the ink density of the full tone in printing within a rotary printing machine which, in spite of a constant ink supply from the inking unit or the ink-applying elements, permits control of the full-tone density or adaptation to the raster tonal values in the print.

The object of the present invention is achieved by a method of varying the ink density of the full tone in printing within a rotary printing machine with an ink application system that provides a constant quantity of ink which includes the steps of (1) setting a binary image on a printing plate in which a basic raster of raster points for the variable area image information is produced on the printing plate and determines the area coverage and (2) superimposing the basic raster on a fine micro raster such that the area coverage of the basic raster is reduced by a percentage within the rage including 0% to 100%. The printing process itself used in this case may, for example, be lithographic offset printing, relief printing, flexographic printing, electrophotographic printing, or electrographic printing. However, the invention is not restricted to these processes.

The geometric tonal value gain when ink is transferred from the printing plate to the printing material is taken into account according to the present invention. The term tonal value gain is based on the term area coverage. Area coverage is defined as the proportion of the area at a specific location which is covered with ink. The area coverage may be measured using optical geometrical measurement methods which measure the pure geometrical area coverage or by the measurement of the transmission relationships of a fully covered area (full tone) and the partially covered area (half tone), which then measure the effective or optical area coverage.

In addition to the full-tone density and therefore the ink layer thickness, the raster point size (in a basic raster) is a critical factor for the print quality. Brighter ink nuances are normally represented in the print by rastering these three primary colours, cyan, magenta and yellow together with black. During the setting of the binary image on the printing plate, the raster point size is defined in accordance with the tonal values of the respective image information. During the rastering process, bright image points are broken down into small raster points and dark image points are broken down into larger raster points (binary, variable-area image information). This applies both to a periodic, autotypical raster and a stochastic raster.

To register and define the various items of binary image information in numeric terms, use is made of the area coverage in percent. A raster tonal value can be specified in percentage of area coverage, that is to say 0% for white and 100% for a solid area. However, as is known, the raster tonal value in the print does not correspond to the geometric area coverage on the printing plate because both geometric and optical effects produce tonal value gain.

The term "tonal value gain" as used herein is therefore the increase in the area coverage from the printing plate to the printed material. The tonal value gain breaks down into two components, i.e., an optical one and a geometric one. The optical component is brought about by immigration of light in the printing material (light capture) from the uncovered areas to the covered areas. The geometric component, which is relevant especially for plate the method according to the invention, is brought about as a result of squeezing effects at the ink transfer points from the printing plate to the printing material or, in electrophotography, by tonal clouds around the actual image points. As a result of this effect, the area on the printing plate not covered by ink, i.e., the uncovered area, is reduced geometrically from the edges of the covered area during transfer of the ink to the printing material.

To control the quantity of ink transferred to the printing material with a constant supply of ink, the basic raster of raster points for the variable-area image information, which determines the area coverage, is superimposed on a very fine microraster which reduces the area coverage of the basic raster by a set percentage. The microraster is preferably finer by at least a factor of two than the basic raster. Then, in accordance with the geometrically covered areas defined by the basic raster and the microraster, the printing plate picks up ink from the system that provides the ink in offset these are the applicator rolls of the inking unit. However, the microraster does not appear on the printed material because of the effect of the tonal value gain, which results from the difference between the known raster tonal value for setting an image on the printing plate and the measured raster tonal value in the print. The tonal value gain as a deviation of the raster tonal value in the print from the raster tonal value of the printing plate can be represented in a print characteristic so that it can be used directly for setting an image and placing the set image on a microraster. The creation of a characteristic based on the tonal value gain and its use in printing process is sufficiently well known from the densitometric measurement techniques for printing machines and is not explained further here.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
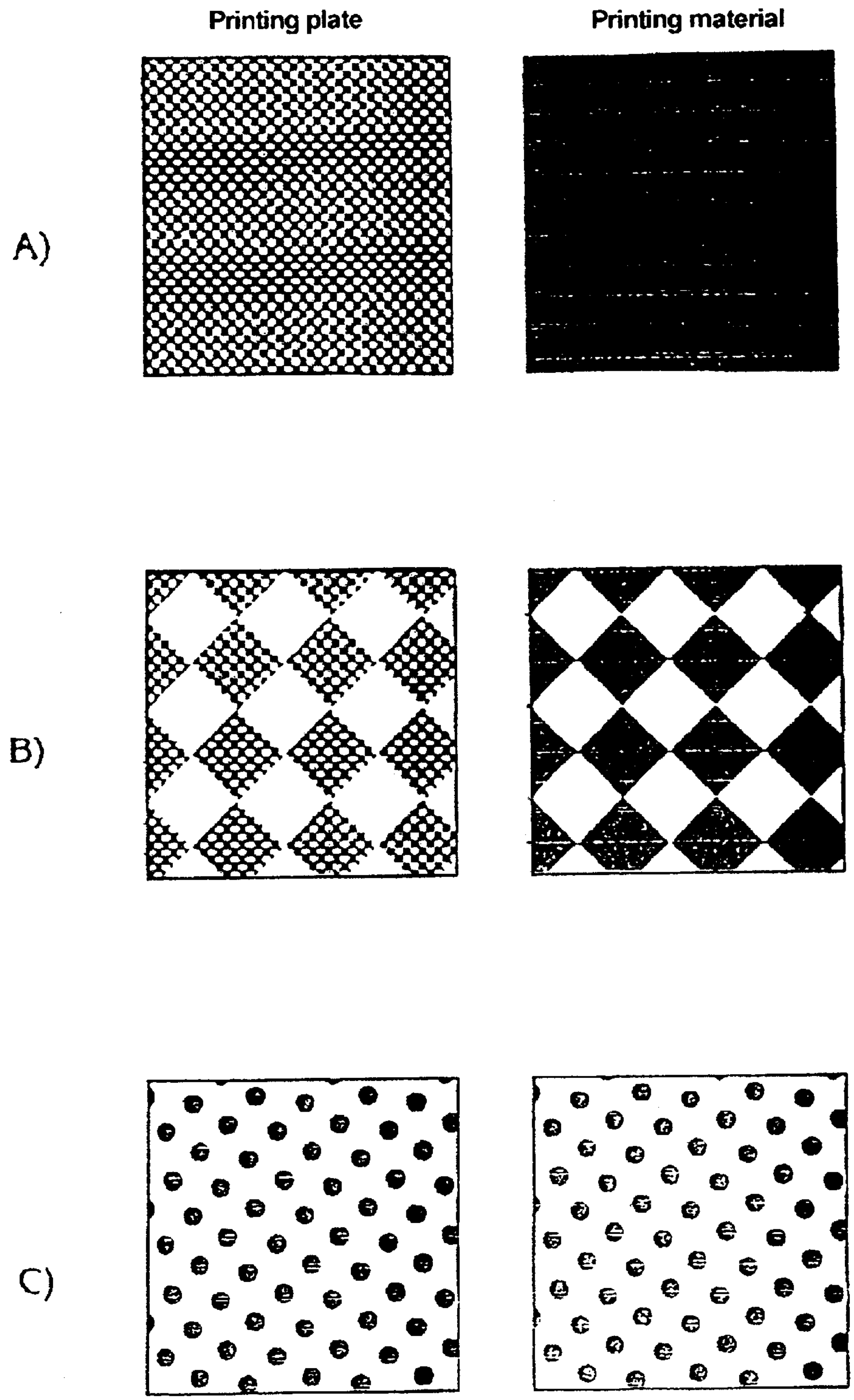
FIGS. 1A, 1B, and 1C show the image on the printing plate and image on the printing material to show the effects of tonal value gain.

FIG. 1A shows the effects of tonal value gain for the case of a solid tone. The pattern of the printing plate in FIG. 1A becomes fuller on the printed material. The basic raster is superimposed on a microraster of 50%, that is to say only about 50% of the amount of ink of a fully covered full tone is picked up. The microraster does not appear on the printing material as a result of the geometric tonal value gain. The result is a full tone with a substantially reduced density.

This procedure can also be continued in the area of raster tones in which the basic raster is a half tones, as shown schematically by FIG. 1B. It is, of course, possible to dispense with a microraster in the region of highlights according to FIG. 1C or to set a 0% tonal value reduction. In addition, a gentle transition with a large reduction at high tonal values and a lower to no reduction at small tonal values is conceivable.

A fact which assists this effect is, moreover, that the ink layer thicknesses transferred decrease proportionally with the diameter of the ink-transferring surface element. This effect begins to occur at about 30 μm diameter of the printing element. For this reason, a fully covered area transfers more ink per unit area than very small raster points with the same geometric area.

Of course, the entire structure of dots must be characterized in terms of its transfer characteristics and must be compensated for. The optical density of a raster point, which is lower as compared with the fully covered area and in particular the full-tonal density as well must of course be taken into account when determining a tonal value curve. The effective optical area coverage is then, analogue to the previous measurement, the ratio between reflectance from the raster area and the full-tone area, even though the printing form can have holes both in the full tone and in the raster point.

The aforementioned procedure can also be transferred to stochastic rasters and hybride rasters. Here, a microraster is placed under the then substantially equally sized dots. In an expanded version of the method, this is then not done following a test of the surrounding, or is done only to a lower extend when a dot stands on its own or a cluster does not exceed a specific size. The microraster can also be applied stochastically, to be specific both in connection with conventional rastering and also with stochastic rastering.

The method according to the invention is preferably used for offset printing with an Anilox inking unit. The printing plate, preferably a plate on which an image can be set thermally or a sleeve without chemical post-treatment, which permits very high edge sharpness and resolution, has an image set on it, within or outside the printing machine, with a resolution of 2000 lines per cm, for example, by means of a laser exposure (see, for example, DE 196 24 441 C1 or EP 0 363 842 B1). The laser exposure writes with continuous beams.

Figure 2:
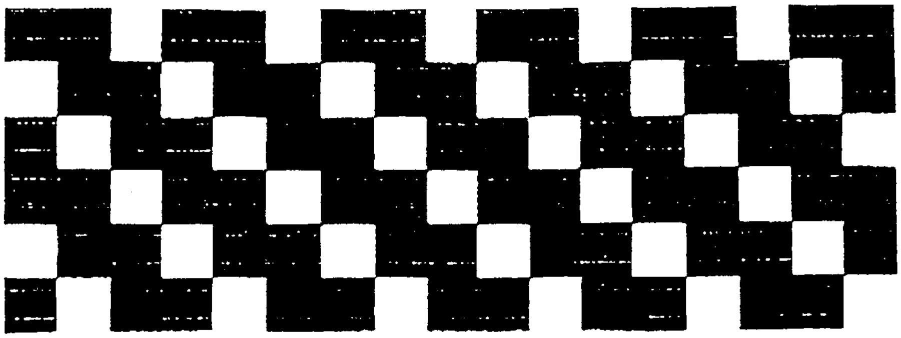
FIG. 2A shows an example where the ink transferred is reduced by 25%.
FIG. 2B shows an example where the ink transferred is reduced by 50%.
Figure 2:
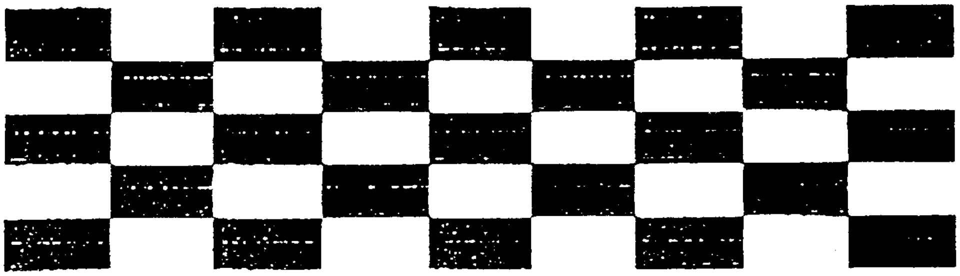

For the maximum transfer of the quantity of ink, the basic raster is not modified, or set to 0% area coverage reduction. To reduce the quantity of ink transferred by 25%, for example, holes are exposed into the covered areas, i.e., the area elements of the binary image information. Accordingly, a fine pattern of holes is produced, so that about 25% of the area forming the basis of the dot remains uncovered (see FIG. 2A). In this example, the write beam of the laser is in each case two pixels (raster points) wide, i.e., switched on for 10 μm, and is then switched off for one pixel (raster point) width, i.e., 5 μm. In the adjacent write cell, the same pattern is then written, offset by one pixel, so that in each case isolated holes 5 μm in size are produced. If a reduction of the quantity of ink by 50% is desired, the system is switched on for two pixels in each case and off for two pixels, and this is done with an offset by two pixels in the adjacent line, so that holes 5 μm×10 μm in size are produced (see FIG. 2B). The 50% reduction is then approximately the limit of the applicability of the method described here, since in the case of even larger reductions in the quantity of ink, the holes outweigh the covered areas.

Figure 3:
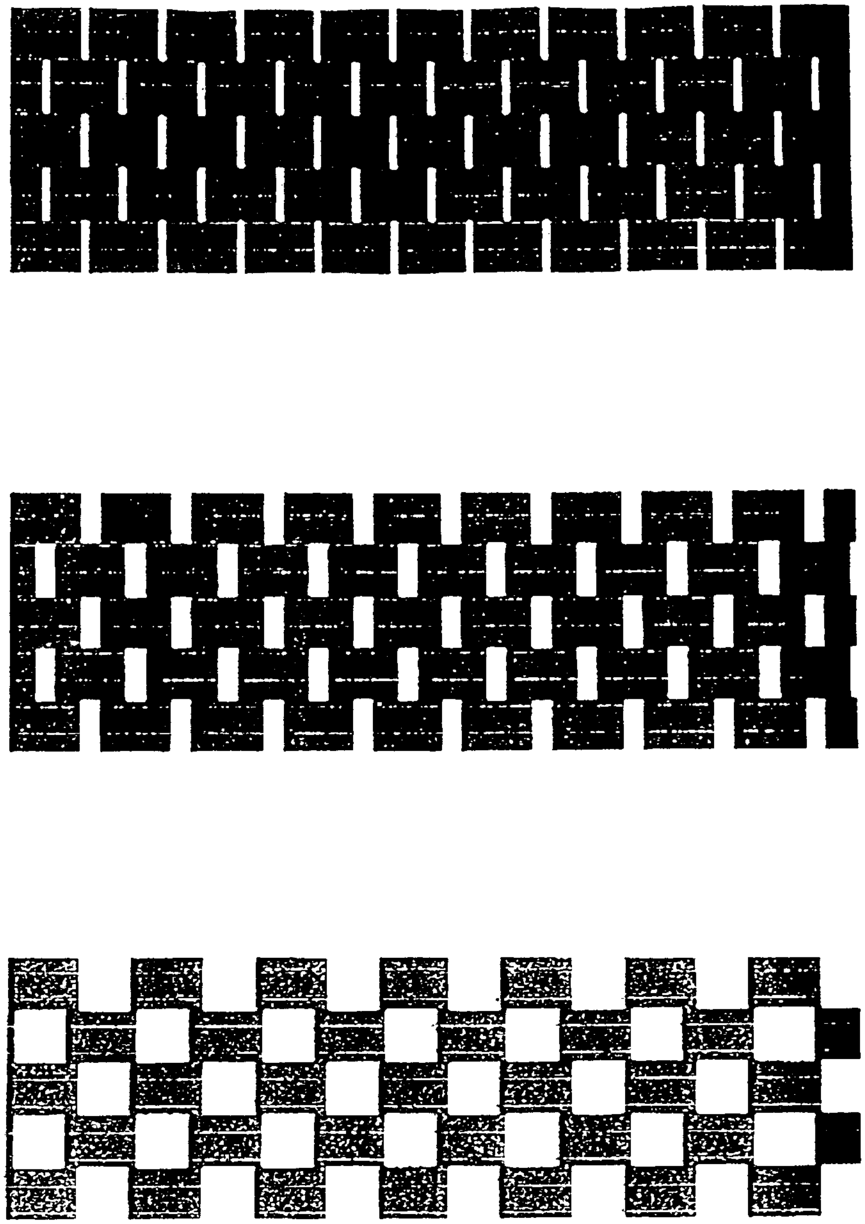
FIGS. 3A, 3B, and 3C show examples of how holes can be produced with respect to scanning.

A further type of embodiment can also make use of larger write beams than 10 μm, but is not restricted to these. If, in the write direction of the laser beam, higher addressibility is implemented than that which corresponds to the dot's diameter, then the addressibility raster in the scanning direction is narrower than transversely with respect to the scanning direction. Rectangular holes can therefore be produced, lying transversely with respect to the scanning direction (see FIG. 3A) as far as a square hole (see FIGS. 3B and 3C) and the rectangular hole in the scanning direction.

The term "rectangular" as used herein is an idealized statement, since virtually any scanning beam is round or rounded and so produces a deformation of the edges of holes which is more or less great and is mostly oriented towards the centre of the hole.

An alternative embodiment of this methodology is provided by the aforementioned fact that the layers of ink transferred decrease with the diameter of the ink transferring element. This effect begins to occur for about 30 μm diameter of the printing element. Ink quantity regulation in the sense of the invention then likewise functions with stochastic rasters of very small basic sizes, for example 5 μm×5 μm, and a dual regulation of the effective optical density, firstly via the effective area coverage, such has previously been successful in the case of stochastic rastering, and secondly via the transfer of the quantity of ink via the decreasing ink layer transfer in the case of small printing dots. In concrete terms, this means that a 50% raster comprising 20 μm dots, for example, transfers more ink than a 50% raster of 10 μm dots, for example. Via the proportion of 20 μm dots to 10 μm dots it is then still possible for an intermediate graduation to be created. In the region of the higher area coverage with the same effective area coverage, the transferred quantity of ink can be controlled via the average hole size. If the holes are larger on average, more ink is transferred than in the case of smaller but more numerous holes for this purpose, since the coherent full-tone areas are then smaller.

In an alternative application of the method according to the invention, the latter can also be used to correct tonal value characteristics in conventional inking units and inking units in which the quantities can be regulated zone by zone or over the entire width.

In this case, the full tone is not penetrated by holes and reduced in terms of its effective density, instead it is only the raster points which are reduced in accordance with predefined characteristic. For example, a printing machine with a linear transfer characteristic can be produced in this way, by the effective tonal value gain just being compensated for.

A further alternative application is a local reduction in the full-tone or raster tonal density, depending on predictable ink transfer deviations from the intended, for example ink fading or ghosting. Compensation for weaknesses in the ink application system is therefore possible and may both be independent of the subject and depend on the subject.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method of varying the ink density of a full tone in printing within a rotary printing machine with an ink application system that supplies a constant quantity of ink, said method comprising the steps of:

setting a binary image on a printing plate, the binary image including a basic raster of raster points for variable-area image information on the printing plate, the raster points determining the area coverage of the basic raster; and superimposing the basic raster on a fine microraster such that the area coverage of the basic raster on the printing plate is reduced by a desired variation from the ink density of a full tone of the basic raster corresponding to a percentage within the range including 0% to 100%, the microraster being produced in regions of the area of the binary image on the printing plate by laser exposures for producing a fine pattern of holes in the basic raster which reduces the area of coverage of the basic raster by a proportion which corresponds to the desired variation in the ink density from the full tone of the basic raster, wherein a desired characteristic that is different from the real characteristic of the basic raster is used as a basis for determining the microraster.

2. The method of claim 1, wherein the rotary printing machine is a lithographic offset printing machine.

3. The method of claim 2, wherein the ink application system is an inking unit which regulates the quantity of ink only over the width of the cylinder.

4. The method of claim 2, wherein the ink application system is an Anilox inking unit.

5. The method of claim 1, wherein the ink application system is an inking unit which regulates the quantity of ink only over the width of the cylinder.

6. The method of claim 1, wherein the ink application system is an Anilox inking unit.

7. The method of claim 1, wherein the rotary printing machine is a flexographic printing machine.

8. The method of claim 1, wherein the rotary printing machine is a relief printing machine.

9. The method of claim 1, wherein the rotary printing machine is a electrophotography printing machine.

10. The method of claim 1, wherein the rotary printing machine is a electrography printing machine.

11. The method of claim 1, wherein said step of producing the microraster further comprises scanning laser beams in a scanning direction and choosing a resolution of the laser beam in the scanning direction to be greater than a distance between adjacent one of said laser beams for producing the basic raster so that the addressibility of the microraster is higher than that which corresponds to the binary image information.

12. The method of claim 1, wherein the microraster is applied stochastically.

13. The method of claim 1, wherein to effect a maximum transfer of the quantity of ink, said step of superimposing comprises superimposing the basic raster on a fine microraster such that the area coverage of the basic raster is reduced by 0%.

14. The method of claim 1, wherein the percentage of the reduction in the area coverage of the basic raster set for the microraster is used to produce a linear transfer characteristic, so that the effective tonal gain is zero.

15. The method of claim 1, wherein said step of superimposing comprises superimposing the basic raster on a fine microraster such that the area coverage of the basic raster is reduced by a desired variation from the full tone to compensate for local transfer deviations from the globally set tonal value characteristics of the inking unit.

* * * * *